(12) United States Patent
Greb et al.

(10) Patent No.: US 12,385,564 B2
(45) Date of Patent: Aug. 12, 2025

(54) HYDRAULIC ARRANGEMENT

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 182 days.

(21) Appl. No.: 18/277,592

(22) PCT Filed: Dec. 3, 2021

(86) PCT No.: PCT/DE2021/100964
§ 371 (c)(1),
(2) Date: Aug. 17, 2023

(87) PCT Pub. No.: WO2022/179652
PCT Pub. Date: Sep. 1, 2022

(65) Prior Publication Data
US 2024/0125383 A1    Apr. 18, 2024

(30) Foreign Application Priority Data
Feb. 23, 2021 (DE) ..................... 10 2021 104 241.0

(51) Int. Cl.
*F16H 61/00*   (2006.01)

(52) U.S. Cl.
CPC ..... *F16H 61/0009* (2013.01); *F16H 61/0025* (2013.01); *F16H 2061/0037* (2013.01)

(58) Field of Classification Search
CPC ............ F16H 51/0009; F16H 61/0025; F16H 2061/0037
See application file for complete search history.

(56) References Cited

FOREIGN PATENT DOCUMENTS

| | | |
|---|---|---|
| DE | 102016206015 A1 | 1/2017 |
| DE | 102016223537 A1 | 5/2018 |
| DE | 102018102690 A1 | 8/2019 |
| DE | 102018112670 A1 | 11/2019 |
| DE | 102019101957 A1 | 7/2020 |
| DE | 102020107544 A1 | 9/2021 |
| DE | 102020131056 A1 | 5/2022 |
| WO | 2009074216 A1 | 6/2009 |
| WO | 2018202234 A1 | 11/2018 |

*Primary Examiner* — Kenneth Bomberg
*Assistant Examiner* — Daniel S Collins
(74) *Attorney, Agent, or Firm* — Matthew V. Evans

(57) ABSTRACT

The disclosure relates to a hydraulic arrangement for actuating hydraulic consumers and for cooling heat sources and/or lubricating component parts, in particular within a drivetrain of a motor vehicle, comprising a reversing pump, by means of which a hydraulic medium can be conveyed in opposite conveying directions, and the reversing pump has a first pump connection and a second pump connection, the hydraulic arrangement comprising an active valve device, the active valve device configured as a 6/2-way valve.

20 Claims, 7 Drawing Sheets

HYDRAULIC ARRANGEMENT

This application is the U.S. National Phase of PCT Application No. PCT/DE2021/100964 filed on Dec. 3, 2021, which claims priority to DE 10 2021 104 241.0 filed on Feb. 23, 2021, the entire disclosures of which are incorporated by reference herein.

TECHNICAL FIELD

The present disclosure relates to a hydraulic arrangement for actuating hydraulic consumers and for cooling heat sources and/or lubricating component parts, in particular within a drivetrain of a motor vehicle.

BACKGROUND

Hydraulic arrangements for actuating hydraulic consumers, for cooling heat sources and/or lubricating component parts within a drivetrain of a motor vehicle are well known from the prior art. There is a continuing need to be able to provide such hydraulic arrangements with high operational reliability as cost-effectively as possible.

SUMMARY

It is therefore the object of the disclosure to eliminate the disadvantages of the prior art and to be able to provide a hydraulic arrangement for actuating hydraulic consumers, for cooling heat sources and/or for lubricating component parts within a drivetrain of a motor vehicle that is optimized in particular with regard to its production costs.

This object is achieved by a hydraulic arrangement for actuating hydraulic consumers and for cooling heat sources and/or lubricating component parts, in particular within a drivetrain of a motor vehicle. The hydraulic arrangement includes a reversing pump, by means of which a hydraulic medium can be conveyed in opposite conveying directions, and the reversing pump has a first pump connection and a second pump connection. The hydraulic arrangement also includes an active valve device, wherein the active valve device is configured as a 6/2-way valve. The 6/2-way valve has a first actuating connection for a first hydraulic actuator, a second actuating connection and a third actuating connection for a second hydraulic actuator, and a fourth actuating connection for a heat source and/or lubrication. The first pump connection of the reversing pump is hydraulically connected to a first valve inlet of the valve device and the second pump connection of the reversing pump is hydraulically connected to a second valve inlet of the valve device. In a first shifting position of the valve device configured as a 6/2-way valve, the first valve inlet is hydraulically coupled to the second actuating connection and the second valve inlet is hydraulically coupled to the third actuating connection, while the first actuating connection and the fourth actuating connection are each in a blocking position. In a second shifting position of the valve device configured as a 6/2-way valve, the first valve inlet is hydraulically coupled to the first actuating connection and the second valve inlet is hydraulically coupled to the fourth actuating connection, while the second actuating connection and the third actuating connection are each in a blocking position.

This has the advantage that during normal driving situations in which no actuation processes are required on the hydraulic actuators, the reversing pump can be driven without an (unwanted) shifting or selection operation being carried out on the hydraulic actuators and at the same time cooling of heat sources and/or lubrication of components is made possible without a separate coolant and/or lubricant pump being required. Instead, according to the disclosure, the reversing pump contained in the actuator system can also be used for this function.

Only in operating situations in which a shifting or selection operation is to be performed on the hydraulic actuators does the supply to the cooling/lubrication circuit have to be interrupted for the duration of the corresponding shifting or selection process. However, since this is usually only required for a short time, this does not generally result in any restrictions for the systems to be cooled and/or lubricated.

According to an example embodiment of the disclosure, it can be provided that the first hydraulic actuator can be coupled to a mechanism on the transmission side that provides the gear selection function of a manual transmission. In this context, according to an example embodiment of the disclosure, it can also be provided that the second hydraulic actuator can be coupled to a mechanism on the transmission side that provides the shifting function of a manual transmission.

Furthermore, according to an example embodiment of the disclosure, it can be provided that the first hydraulic actuator is be subjected to spring force by a spring element counter to its disengagement direction, such that no separate hydraulic connection is required to return the first hydraulic actuator to its initial position and the actuator can be operated with a hydraulic connection.

According to an example embodiment of the disclosure, it can be provided that a first pressure-limiting valve is arranged between the first pump connection of the reversing pump and a hydraulic reservoir, wherein the spring element is configured in such a way that the hydraulic pressure caused by the spring element is less than the hydraulic pressure required to open the pressure-limiting valve, such that no unintentional discharge of hydraulic fluid can occur.

Furthermore, the disclosure can also be further developed in such a way that a second pressure-limiting valve is arranged between the second pump connection of the reversing pump and a hydraulic reservoir, by means of which overpressure can be discharged from the hydraulic system, in particular in order to avoid damage to the actuating module due to overloading.

In an example embodiment variant of the disclosure, it can also be provided that a first non-return valve is arranged between the first pump connection of the reversing pump and the hydraulic reservoir in a first intake line. It can also be advantageous to further develop the disclosure in such a way that a second non-return valve is arranged between the second pump connection of the reversing pump and the hydraulic reservoir in a second intake line. By means of the non-return valves, it is possible to deliver hydraulic medium from the hydraulic reservoir at a predefined intake capacity of the reversing pump.

According to an example embodiment of the subject matter of the disclosure, it can be provided that a pressure-limiting valve is arranged in the hydraulic path between the fourth actuating connection and the heat source and/or lubrication, whereby overloading in this hydraulic path can be avoided.

Finally, the disclosure can also be implemented in an advantageous manner such that the hydraulic path opens into the hydraulic reservoir.

In an example embodiment variant of the disclosure, it can also be provided that an intake filter is arranged in the hydraulic path between the reversing pump, the intake lines and the hydraulic reservoir. As a result, any dirt that may be present, in particular solid particles, can be removed from the hydraulic fluid.

It can also be advantageous to further develop the disclosure in such a way that the reversing pump, the hydraulic reservoir, the active valve device, the first hydraulic actuator and the second hydraulic actuator are combined to form a subassembly, such that this subassembly—because it is prefabricated—can be installed particularly easily.

The disclosure will be explained in more detail below with reference to figures without limiting the general concept of the disclosure.

DETAILED DESCRIPTION

Figure 1:
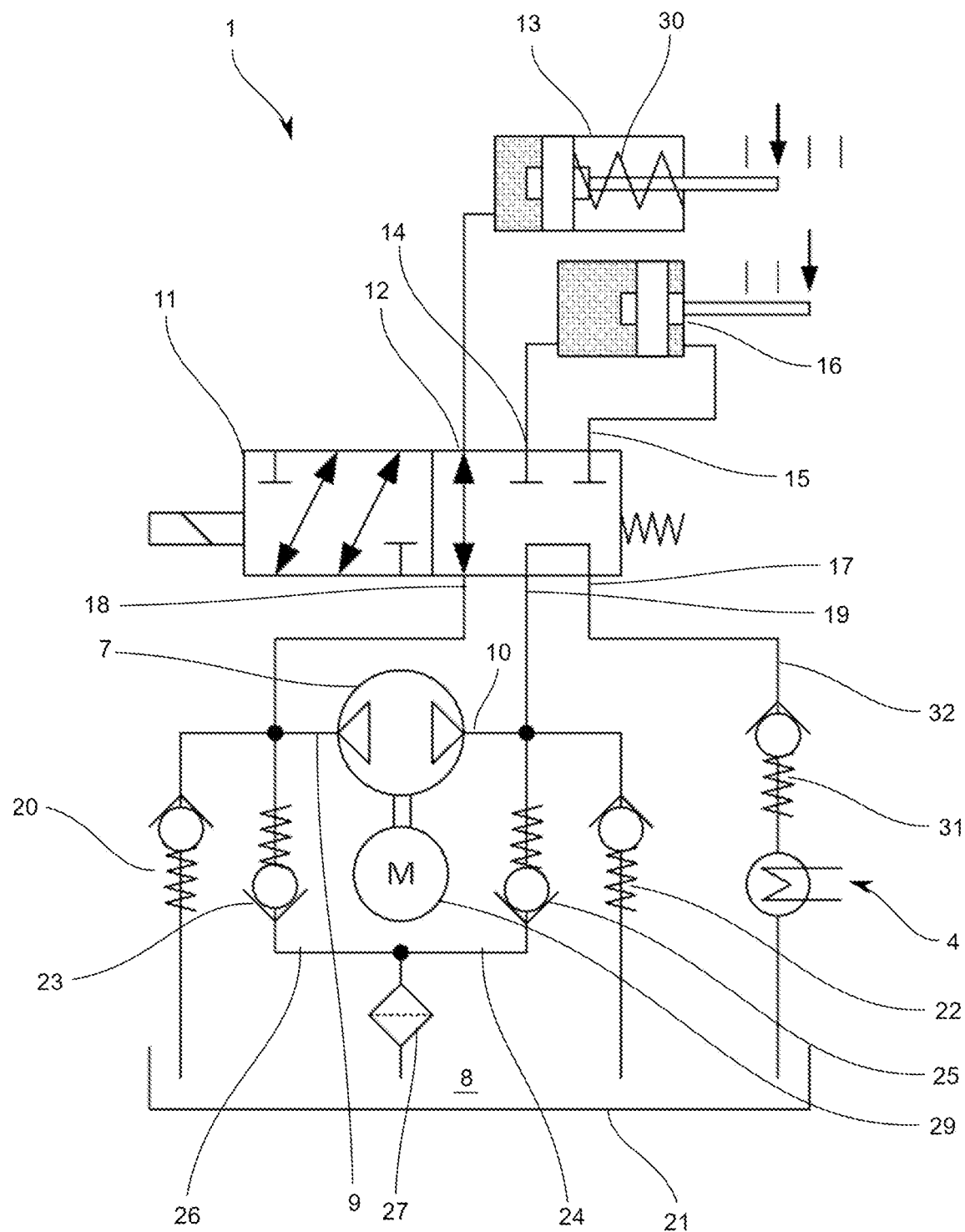
FIG. 1 shows a hydraulic circuit diagram of the hydraulic arrangement in a first shifting position of the 6/2-way valve and the reversing pump switched off.
Figure 2:
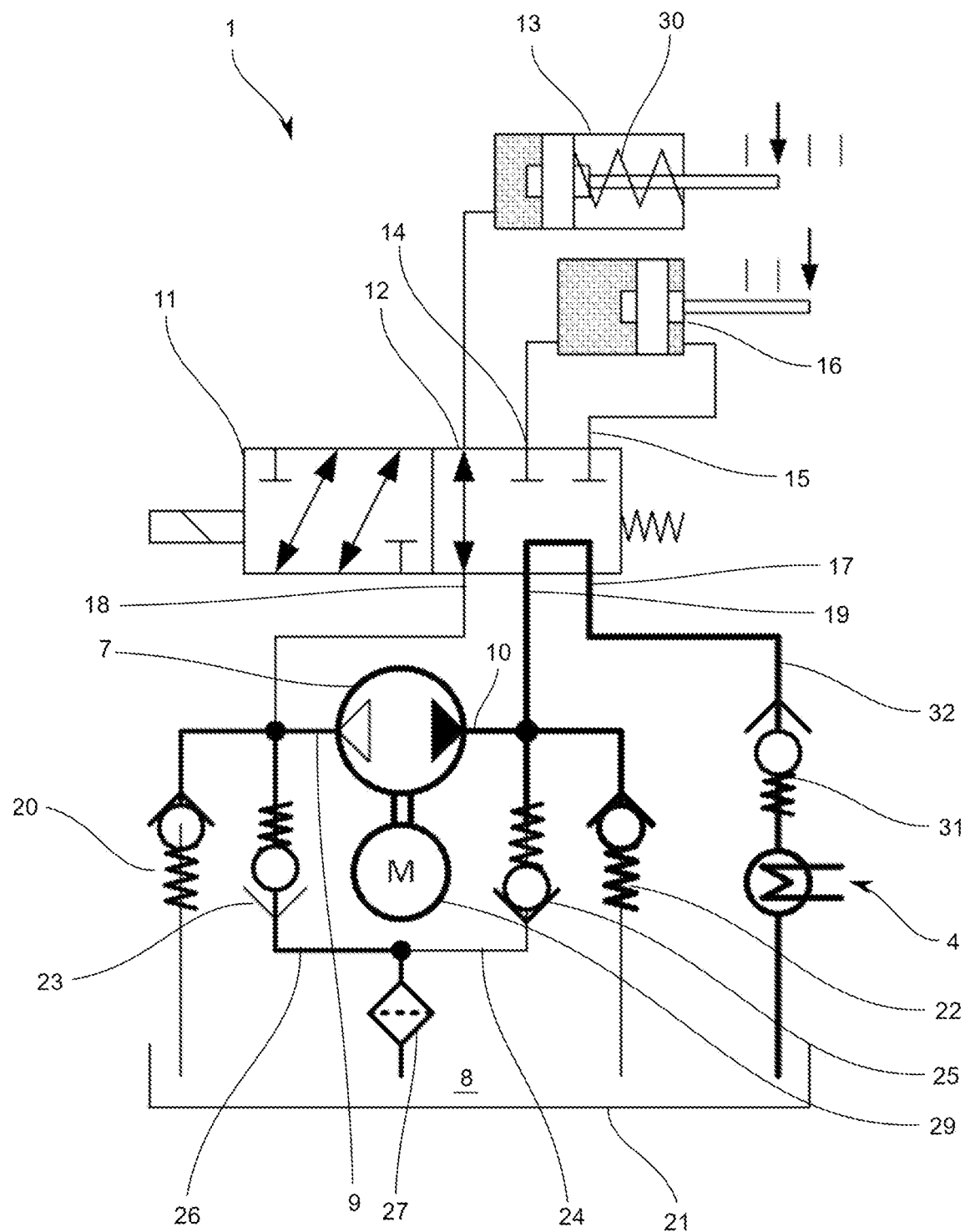
FIG. 2 shows a hydraulic circuit diagram of the hydraulic arrangement in a first shifting position of the 6/2-way valve and with a reversing pump operated in a first conveying direction.
Figure 7:
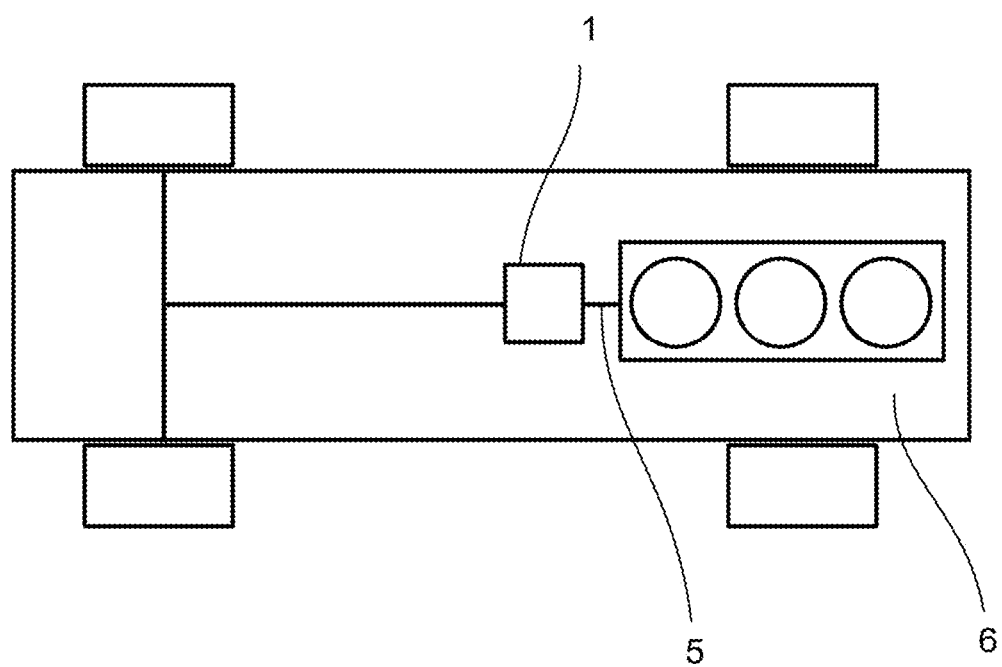
FIG. 7 shows a motor vehicle with a hydraulic arrangement in a block diagram.

FIG. 1 shows a hydraulic arrangement 1 for actuating hydraulic consumers 13, 16 and for cooling heat sources 4 and/or lubricating component parts within a drivetrain 5 of a motor vehicle 6, as shown in FIG. 7 as an example.

The hydraulic arrangement 1 comprises a reversing pump 7 driven by the pump motor 29, by means of which a hydraulic medium 8 can be conveyed in opposite conveying directions. Accordingly, the reversing pump 7 has a first pump connection 9 and a second pump connection 10.

The hydraulic system 1 further comprises an active valve device 11, which is configured as a 6/2-way valve. The active valve device 11 has six connections and two shifting positions, which are explained in more detail below.

A first actuating connection 12 is provided on the 6/2-way valve for a first hydraulic actuator 13. The second hydraulic actuator 16 is connected to a second actuating connection 14 and a third actuating connection 15. Furthermore, the 6/2-way valve has a fourth actuating connection 17 for a heat source 4 and/or lubrication.

In addition to these four connections 12, 14, 15, 17 provided for hydraulic consumers, the 6/2-way valve also has a first valve inlet 18 for connecting the first pump connection 9 of the reversing pump 7 and a second valve inlet 19 for connecting the second pump connection 10 of the reversing pump 7.

A first pressure-limiting valve 20 is arranged between the first pump connection 9 of the reversing pump 7 and a hydraulic reservoir 21, wherein the spring element 30 is configured in such a way that the hydraulic pressure caused by the spring element 30 is less than the hydraulic pressure required to open the pressure-limiting valve 20, such that no unintentional draining of hydraulic fluid 8 via the pressure relief valve 20 can occur here.

FIG. 1 also shows that a second pressure-limiting valve 22 is arranged between the second pump connection 10 of the reversing pump 7 and a hydraulic reservoir 21, and a first non-return valve 23 is arranged between the first pump connection 9 of the reversing pump 7 and the hydraulic reservoir 21 in a first intake line 26. FIG. 1 also shows that a second non-return valve 25 is arranged between the second pump connection 10 of the reversing pump 7 and the hydraulic reservoir 21 in a second intake line 24. A pressure-limiting valve 31 is also arranged in the hydraulic path 32 between the fourth actuating connection 17 and the heat source 4 and/or lubrication. The hydraulic path 32 opens into the hydraulic reservoir 21.

Figure 5:
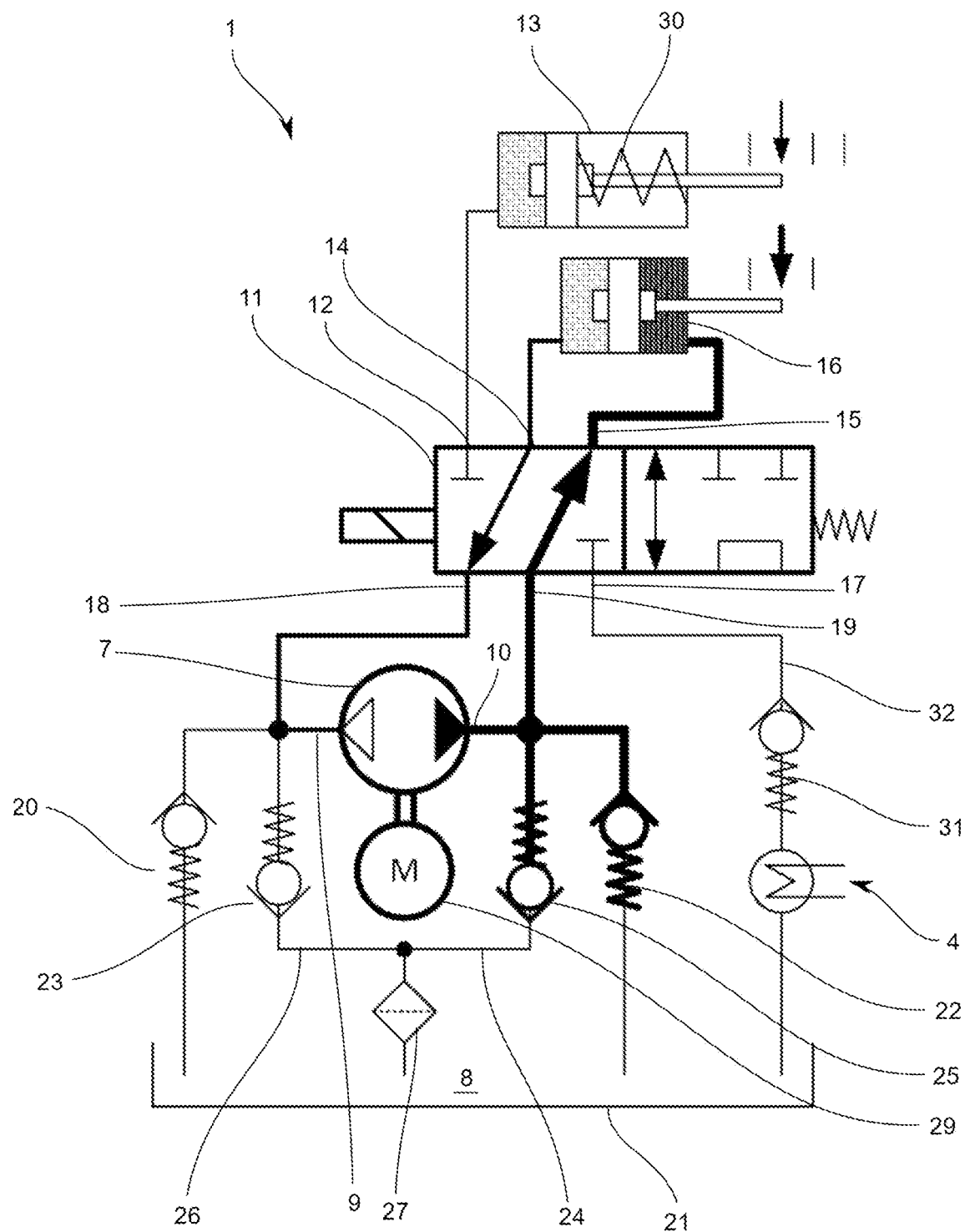
FIG. 5 shows a hydraulic circuit diagram of the hydraulic arrangement in a second shifting position of the 6/2-way valve and with a reversing pump operated in a first conveying direction.
Figure 6:
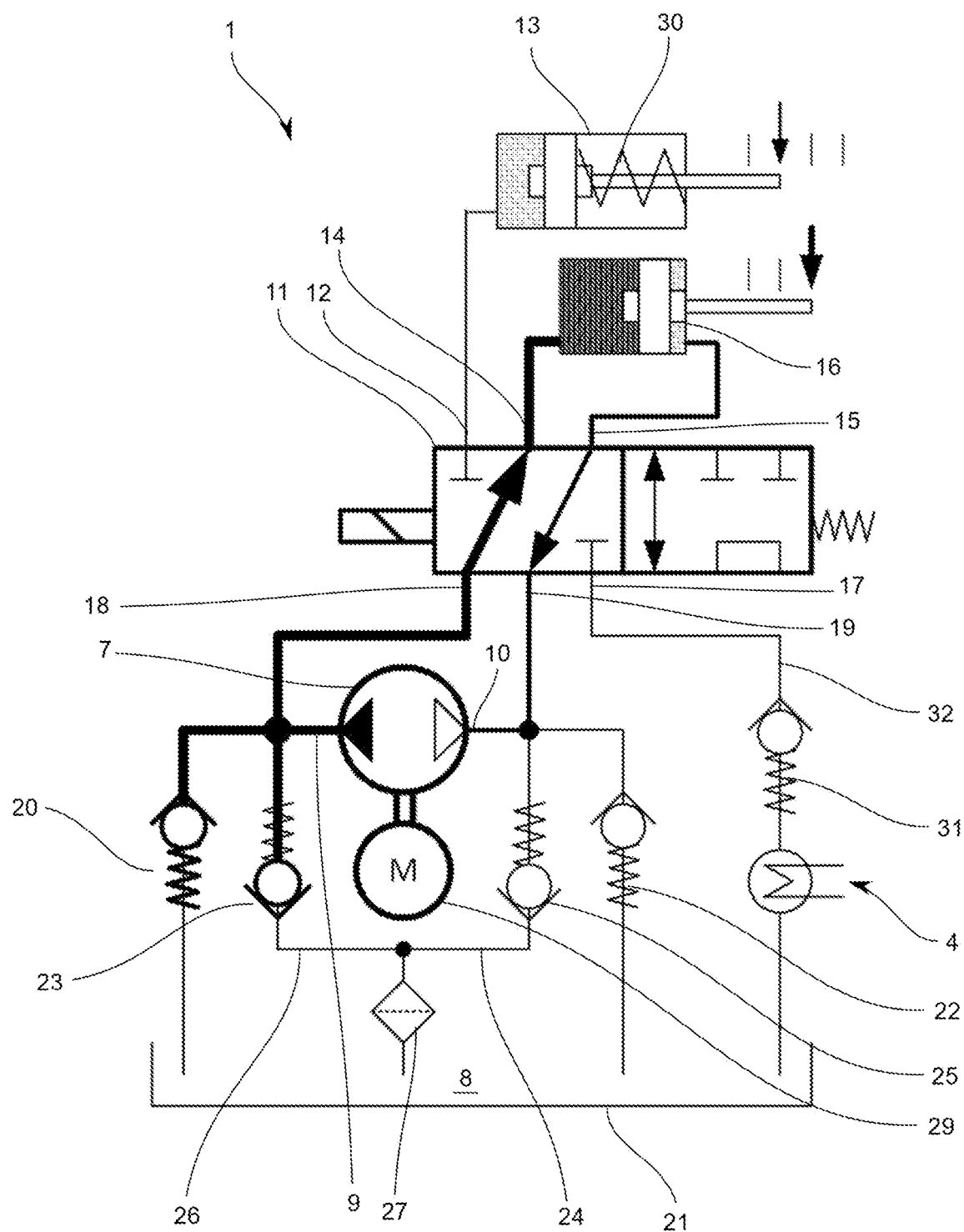
FIG. 6 shows a hydraulic circuit diagram of the hydraulic arrangement in a second shifting position of the 6/2-way valve and with a reversing pump operated in a second conveying direction.

The first shifting position of the 6/2-way valve is shown in FIGS. 5-6 and the second shifting position is shown in FIGS. 1-4. In FIGS. 2-6, the hydraulically pressurized hydraulic paths are highlighted in bold. The bold arrows of the reversing pump 7 indicate the conveying direction. First, the second shifting position is explained with reference to FIGS. 1-4.

In the second shifting position of the valve device 11 configured as a 6/2-way valve, the first valve inlet 18 is hydraulically coupled to the first actuating connection 12 in both flow directions. The second valve inlet 19 is directly connected to the fourth actuating connection 17, while the second actuating connection 14 and the third actuating connection 15 are each in a blocking position.

From this first operating state of the hydraulic system 1, the reversing pump 7 can now be operated in a first conveying direction, which results in hydraulic fluid 8 being conveyed from the hydraulic reservoir 21 into the hydraulic path 32 to a heat source 4 and from there back into the hydraulic reservoir 21. The intake or pump capacity of the reversing pump 7 is set in such a way that the non-return valve 23 opens and hydraulic fluid 8 is drawn out of the hydraulic reservoir 21 via the non-return valve 23 to the reversing pump 7 and the pressure on the pump side of the reversing pump 7 is so high that the pressure-limiting valve 31 opens while the pressure-limiting valve 22 is still closed. In this operating state, the components arranged in the hydraulic path 32 are therefore cooled and/or lubricated.

Figure 3:
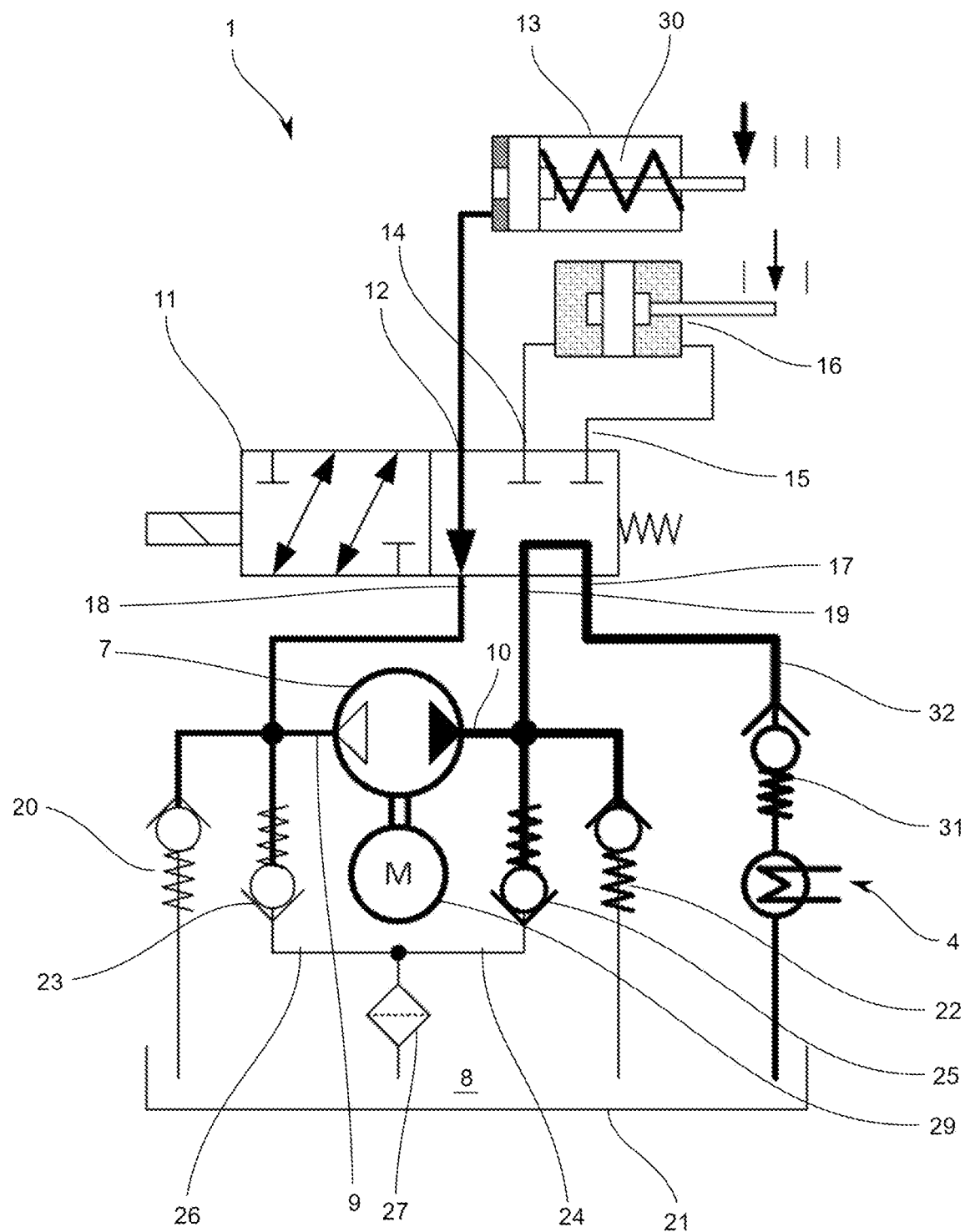
FIG. 3 shows a hydraulic circuit diagram of the hydraulic arrangement in a first shifting position of the 6/2-way valve and with a reversing pump operated in a first conveying direction.
Figure 4:
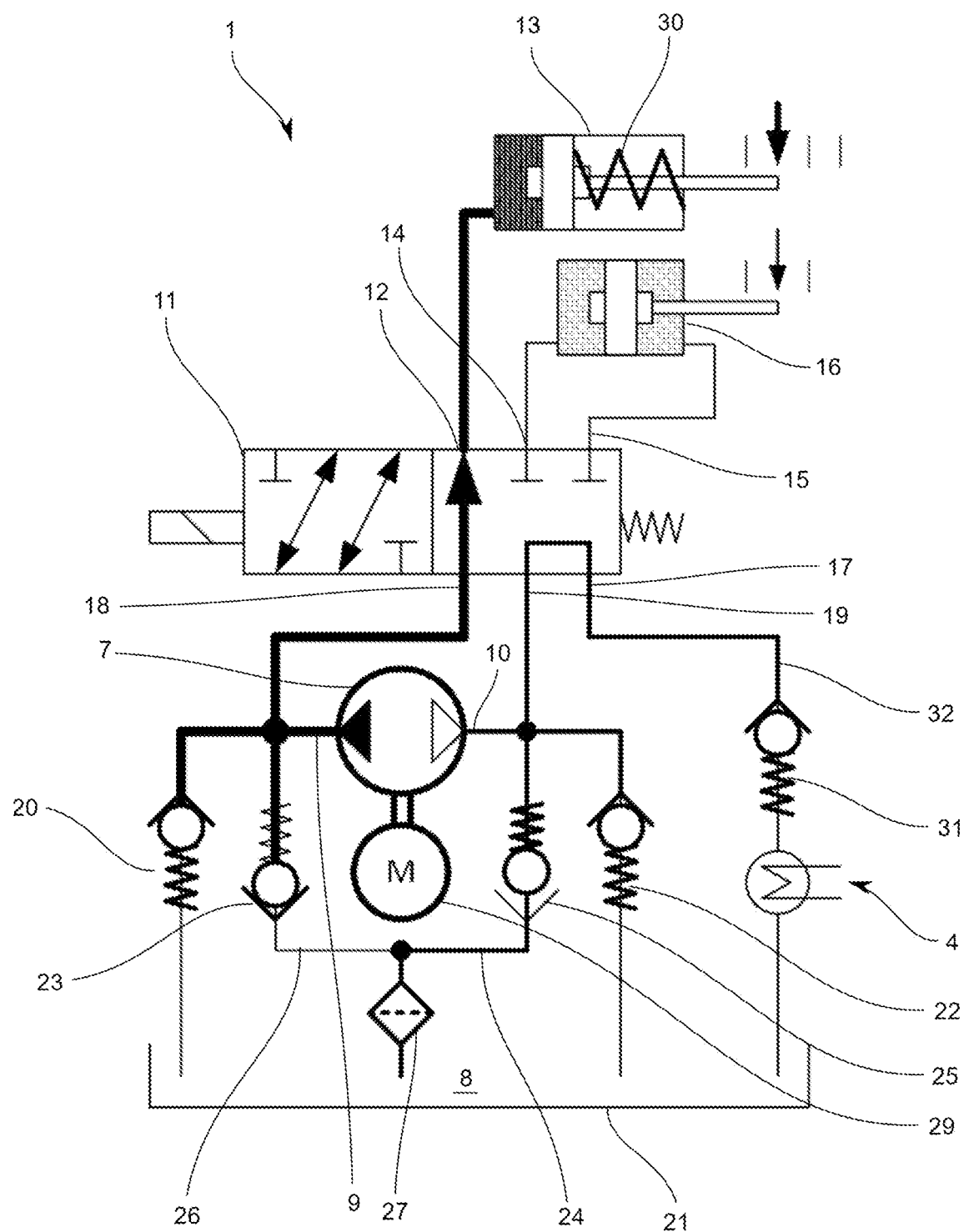
FIG. 4 shows a hydraulic circuit diagram of the hydraulic arrangement in a first shifting position of the 6/2-way valve and with a reversing pump operated in a second conveying direction.

If the intake or pump capacity of the reversing pump 7—as shown in FIG. 3—is reduced to a predefined level, the non-return valve 23 closes and hydraulic fluid 8 is drawn out of the hydraulic path between the first valve inlet 18 and the first hydraulic actuator 13, such that the pressure in this hydraulic path drops and the spring 30 of the first hydraulic actuator 13 can convert this into its engaged operating position by means of spring force. As a result, the first hydraulic actuator 13 can be transferred into a first engaged operating position, while the reversing pump 7 is still pumping hydraulic fluid 8 into the hydraulic path 32 for cooling and/or lubricating component parts, but with reduced pump capacity.

To disengage the first hydraulic actuator 13, the reversing pump 7 can be set in an opposite conveying direction, such that in the second shifting position of the 6/2-way valve, pressure can build up in the hydraulic path between the first valve inlet 18 and the first hydraulic actuator 13, which is adjusted in such a way that the first hydraulic actuator 13 can be converted into a disengaged operating position against the spring force of the spring 30 acting thereon. The intake or pumping capacity of the reversing pump 7 is selected in such a way that the non-return valve 25 opens on the intake side of the reversing pump 7 and hydraulic fluid 8 is conveyed out of the hydraulic reservoir 21. During this operating state of the hydraulic system 1, there is no cooling or lubrication of the component parts along the hydraulic path 32 due to the reversal of the conveying direction of the reversing pump 7.

The first shifting position of the valve device 11 configured as a 6/2-way valve is explained in more detail below with reference to FIGS. 5-6.

As shown in FIG. 5, in the first shifting position, the first valve inlet 18 is hydraulically coupled to the second actuating connection 14 and the second valve inlet 19 is hydraulically coupled to the third actuating connection 15, while the first actuating connection 12 and the fourth actuating connection 17 are each in a blocking position. If the reversing pump 7 is set in a first conveying direction in this first shifting position of the 6/2-way valve, the second hydraulic actuator 16 is engaged, whereas it is disengaged in the second conveying direction of the reversing pump 7, which is shown in FIG. 6. To actuate the second hydraulic actuator 16, the hydraulic fluid 8 is merely pumped back and forth between the engagement side of the second hydraulic actuator 16 and its disengagement side, which can also be clearly seen from the closed valves 20, 22, 23, 25. During the actuation of the second hydraulic actuator 16, there is also no cooling or lubrication of component parts in the hydraulic path 32.

In the exemplary embodiment shown in FIGS. 1-6, the first hydraulic actuator 13 is coupled to a mechanism on the transmission side providing the gear selection function of a manual transmission, while the second hydraulic actuator 16 is coupled to a mechanism on the transmission side providing the shifting function of a manual transmission.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Hydraulic arrangement
4 Heat source
5 Drivetrain
6 Motor vehicle
7 Reversing pump
8 Hydraulic medium
9 Pump connection
10 Pump connection
11 Valve device
12 Actuating connection
13 Consumer
14 Actuating connection
15 Actuating connection
16 Consumer
17 Actuating connection
18 Valve inlet
19 Valve inlet
20 Pressure-limiting valve
21 Hydraulic reservoir
22 Pressure-limiting valve
23 Non-return valve
24 Intake line
25 Non-return valve
26 Intake line
30 Spring element
31 Pressure-limiting valve
32 Path

The invention claimed is:

1. A hydraulic arrangement configured for actuating hydraulic consumers and for one or both of either cooling a heat source or lubricating a component part within a drivetrain of a motor vehicle, the hydraulic arrangement comprising:
   a reversing pump configured for conveying hydraulic medium in opposite conveying directions, the reversing pump having a first pump connection and a second pump connection,
   an active valve device configured as a 6/2-way valve, the active valve device having:
      a first actuating connection for a first hydraulic actuator,
      a second actuating connection and a third actuating connection for a second hydraulic actuator,
      a fourth actuating connection for cooling at least one of the heat source or lubricating the component part,
   wherein:
   the first pump connection of the reversing pump is hydraulically connected to a first valve inlet of the active valve device and the second pump connection of the reversing pump is hydraulically connected to a second valve inlet of the active valve device, and
   in a first shifting position of the active valve device:
   the first valve inlet is hydraulically coupled to the second actuating connection and the second valve inlet is hydraulically coupled to the third actuating connection when the first actuating connection and the fourth actuating connection are each in a blocking position, and
   in a second shifting position of the active valve device;
      the first valve inlet is hydraulically coupled to the first actuating connection and the second valve inlet is hydraulically coupled to the fourth actuating connection when the second actuating connection and the third actuating connection are each in a blocking position.

2. The hydraulic arrangement according to claim 1, wherein the first hydraulic actuator is coupled to a mechanism configured to provide a gear selection function of a manual transmission.

3. The hydraulic arrangement according to claim 1, wherein the second hydraulic actuator can be coupled to a mechanism configured to provide a shifting function of a manual transmission.

4. The hydraulic arrangement according to claim 1, wherein the first hydraulic actuator is subjected to a spring force by a spring element counter to a disengagement direction of the first hydraulic actuator.

5. The hydraulic arrangement according to claim 4, further comprising a first pressure-limiting valve arranged between the first pump connection of the reversing pump and a hydraulic reservoir, wherein the spring element is configured so that a hydraulic pressure caused by the spring element is less than a hydraulic pressure required to open the first pressure-limiting valve.

6. The hydraulic arrangement according to claim 5, further comprising a second pressure-limiting valve arranged between the second pump connection of the reversing pump and a hydraulic reservoir.

7. The hydraulic arrangement according to claim 1, further comprising a first non-return valve arranged between the first pump connection of the reversing pump and a hydraulic reservoir in a first intake line.

8. The hydraulic arrangement according to claim 7, further comprising a second non-return valve arranged between the second pump connection of the reversing pump and the hydraulic reservoir in a second intake line.

9. The hydraulic arrangement according to claim 1, further comprising a pressure-limiting valve arranged in a hydraulic path extending between the fourth actuating connection and at least one of the heat source or the component part configured to be lubricated.

10. The hydraulic arrangement according to claim 9, wherein the hydraulic path opens into a hydraulic reservoir.

11. A hydraulic arrangement configured for actuating hydraulic consumers and for one or both of either cooling a heat source or lubricating a component part within a drivetrain of a motor vehicle, the hydraulic arrangement comprising:
a reversing pump configured for conveying hydraulic medium in opposite conveying directions, the reversing pump a first pump connection and a second pump connection,
an active valve device configured as a 6/2-way valve, the active valve device having:
a first actuating connection for a first hydraulic actuator,
a second actuating connection and a third actuating connection for a second hydraulic actuator,
a fourth actuating connection for at least one of cooling the heat source or lubricating the component part,
a hydraulic reservoir hydraulically connected to the reversing pump and the active valve device, wherein:
the first pump connection of the reversing pump is hydraulically connected to a first valve inlet of the active valve device and the second pump connection of the reversing pump is hydraulically connected to a second valve inlet of the active valve device, and
in a first shifting position of the active valve device:
the first valve inlet is hydraulically coupled to the second actuating connection and the second valve inlet is hydraulically coupled to the third actuating connection when the first actuating connection and the fourth actuating connection are each in a blocking position, and in a second shifting position of the active valve device:
the first valve inlet is hydraulically coupled to the first actuating connection and the second valve inlet is hydraulically coupled to the fourth actuating connection when the second actuating connection and the third actuating connection are each in a blocking position.

12. The hydraulic arrangement according to claim 11, wherein the reversing pump, the hydraulic reservoir, the active valve device, the first hydraulic actuator, and the second hydraulic actuator are combined to form a subassembly configured to be installed as a unit within the motor vehicle.

13. The hydraulic arrangement according to claim 12, wherein the first hydraulic actuator is coupled to a mechanism configured to provide a gear selection function of a manual transmission.

14. The hydraulic arrangement according to claim 13, wherein the second hydraulic actuator can be coupled to a mechanism configured to provide a shifting function of a manual transmission.

15. The hydraulic arrangement according to claim 12, wherein the first hydraulic actuator is subjected to a spring force by a spring element counter to a disengagement direction of the first hydraulic actuator.

16. The hydraulic arrangement according to claim 15, further comprising a first pressure-limiting valve arranged between the first pump connection of the reversing pump and the hydraulic reservoir, wherein the spring element is configured so that a hydraulic pressure caused by the spring element is less than a hydraulic pressure required to open the first pressure-limiting valve.

17. The hydraulic arrangement according to claim 16, further comprising a second pressure-limiting valve arranged between the second pump connection of the reversing pump and the hydraulic reservoir.

18. The hydraulic arrangement according to claim 17, further comprising a first non-return valve arranged between the first pump connection of the reversing pump and the hydraulic reservoir in a first intake line.

19. The hydraulic arrangement according to claim 18, further comprising a second non-return valve arranged between the second pump connection of the reversing pump and the hydraulic reservoir in a second intake line.

20. The hydraulic arrangement according to claim 12, further comprising a pressure-limiting valve arranged in a hydraulic path extending between the fourth actuating connection and at least one of the heat source or the component part configured to be lubricated.

* * * * *